United States Patent [19]

Barkhurst

[11] Patent Number: 5,238,410
[45] Date of Patent: Aug. 24, 1993

[54] APPARATUS FOR DEMONSTRATING GEOMETRICAL AND GRAVITATIONAL RELATIONSHIPS

[76] Inventor: Clinton Barkhurst, 685 State St., Redding, Calif. 96001

[21] Appl. No.: 916,164

[22] Filed: Jul. 17, 1992

[51] Int. Cl.⁵ .............................................. G09B 23/08
[52] U.S. Cl. .................................... 434/302; 211/69.2
[58] Field of Search ........................ 434/302, 300, 211; 446/219, 168; 472/57, 68; 211/69.1, 69.2

[56] References Cited

U.S. PATENT DOCUMENTS

| | | | |
|---|---|---|---|
| D. 253,179 | 10/1979 | Bosler | D19/82 |
| 2,167,992 | 8/1939 | Olsen | 446/236 |
| 2,227,705 | 1/1941 | Colucci | 273/322 |
| 2,603,885 | 7/1952 | Bates | 434/302 |
| 2,678,515 | 5/1954 | Desiderio | 446/236 |
| 3,394,489 | 7/1968 | Martin | 446/168 |
| 4,028,818 | 6/1977 | Warner et al. | 434/302 |
| 4,669,727 | 6/1987 | David | 273/110 |

OTHER PUBLICATIONS

Chicago Apparatus Co., "Scientific Laboratory Equipment" (Catalog #44), Mar., 1931, p. 295, item #709R.
Combosco Scientific Co., "Combosco Order Book", (1954-1955 Catalog), p. 57, item #43-270.
The Welch Scientific Co., "Welch Laboratory Apparatus", p. 91, item #0853 (Filed with Scientific Library Oct. 25, 1965).
Fisher Scientific Co., Stansi Scientific Division, (catalog), p. 122, item #40923 (filed with Scientific Library Aug., 1968).

*Primary Examiner*—Cary E. O'Connor
*Assistant Examiner*—Jeffrey A. Smith
*Attorney, Agent, or Firm*—John P. O'Banion

[57] ABSTRACT

An apparatus for creating the illusion of a weighted body (10) rolling uphill on a diamond-shaped track (12) and demonstrating the geometrical relationship between the body and the track, includes a conically sectioned and tapered body (10) having plates (26, 28) disposed about its ends and a diamond-shaped track (12) having a pair of upwardly diverging spaced apart rails (50a, 50b) with apexes (20a, 20b) at their center portions and planar lower edges (38). The body (10), when disposed on the track (12), will roll unassisted towards the apex of the rails (50a, 50b) and continue to roll back and forth along the track (12) until coming to rest at the apexes (20a, 20b).

12 Claims, 2 Drawing Sheets

FIG.—1

APPARATUS FOR DEMONSTRATING GEOMETRICAL AND GRAVITATIONAL RELATIONSHIPS

BACKGROUND OF THE INVENTION

1. Field of the Invention

This invention pertains generally to a mass rolling along a track, and more specifically to an apparatus for creating the illusion of a track-guided body rolling unassisted uphill against the pull of gravity and demonstrating the geometrical relationships of the body and the track.

2. Description of the Background Art

Various devices for demonstrating the laws of gravity have been heretofore developed. For example, U.S. Pat. No. 2,603,885 issued to Bates on Jul. 22, 1952, discloses a gravity illustrating toy in which a conical body rolls along a track to create the illusion of rolling uphill. U.S. Pat. No. 2,678,515 issued to Desiderio on May 18, 1954 discloses a rolling wheel toy. U.S. Pat. No. 4,028,818 issued to Warner et al. on Jun. 14, 1977 discloses a tracked incline teaching apparatus. U.S. Pat. No. 4,669,727 issued to David on Jun. 2, 1987, discloses a double-bar riding wheel and method of use. U.S. Pat. No. 2,227,705 issued to Colucci on Jan. 7, 1941 discloses an amusement toy. U.S. Pat. No. 2,167,992 issued to Olsen on Aug. 1, 1939 discloses balancing sticks. U.S. Pat. No. 3,394,489 issued to Martin on Jul. 30, 1968 discloses an article roll game and track therefor. U.S. Pat. No. D-253,179 discloses an ornamental design for a holder for small stationary items.

None of the foregoing devices, however, convincingly create the illusion of a body or mass rolling unassisted uphill against the pull of gravity, while at the same time illustrating the geometric relationships between the rolling body and the track which create the illusion. Furthermore, many of these devices require careful placement of the rolling body on the track to keep it from rolling off. Others must be assembled prior to use and require considerable manual dexterity in their operation. The present invention overcomes those deficiencies and provides for a clear demonstration of gravitational effects on a rolling body.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention pertains generally to a body which rolls along a track and creates the illusion that the body is rolling uphill in defiance of the law of gravity. By way of example, and not of limitation, the apparatus includes a rolling body generally comprising two substantially conic sections joined concentrically at their base, terminating in a plate at each apical end. A track generally comprising four panels connected end to end to form a diamond-shaped structure supports and guides the rolling body. The bottom edge of each panel is substantially horizontal, and each top edge of each panel is sloped. The panels, at their obtuse angled joints, form two opposing syncline rails, and their oblique angled joints, form two opposing anticline rails.

The rolling body spans the width of the track upon which it is disposed so that the plates are distal of the panels of the track, and the conic sections are ensconced between them. In the orientation described, once the rolling body is placed on the track near one end, it will roll towards the other end under the force of gravity, appearing to roll uphill along the cradle rails, back and forth from end to end until coming to rest at the apices of the cradle. In order to clearly create the illusion of rolling uphill, the bearing surfaces of the conical portions of the rolling body must be concealed from direct view. This is accomplished in the present invention by plates which are secured to each end of the rolling body. The plates, being distal to the rails as the rolling body is disposed upon the rails and allowed to roll, obscure the view of the contact points between the rolling body and the rails. Additionally, a benefit of the plates is that even if the rolling body is not placed squarely or centered in the track, the rolling body tends to maintain itself disposed between the track rails as it rolls.

An additional advantage of the apparatus is that the plates on each end of the rolling body permit the rolling body to also serve as a paper weight by standing it on either end. In addition, the track is of one-piece construction and requires no assembly prior to use, and can be secured to a base fashioned to hold other useful objects which may enhance its usefulness and attractiveness.

An object of the invention is to provide an apparatus which creates the illusion of a weight rolling uphill against the pull of gravity.

Another object of the invention is to provide a rolling body which will not fall off its track.

Another object of the invention is to demonstrate the geometric relationship between a rolling body and a track that creates the illusion of the body rolling uphill.

Another object of the invention is to provide a rolling body and track wherein the rolling body can be placed on the track with minimum regard to alignment.

Another object of the invention is to provide a rolling body which will straighten itself if placed on the track at an angle.

Another object of the invention is to obscure from view the point of contact between the rolling body and the track.

Another object of the invention is to obscure from view the center of mass of the rolling body.

Another object of the invention is to provide a track which does not require assembly.

Another object of the invention is to provide a gravity illustrating device which functions as a paperweight when not in use.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
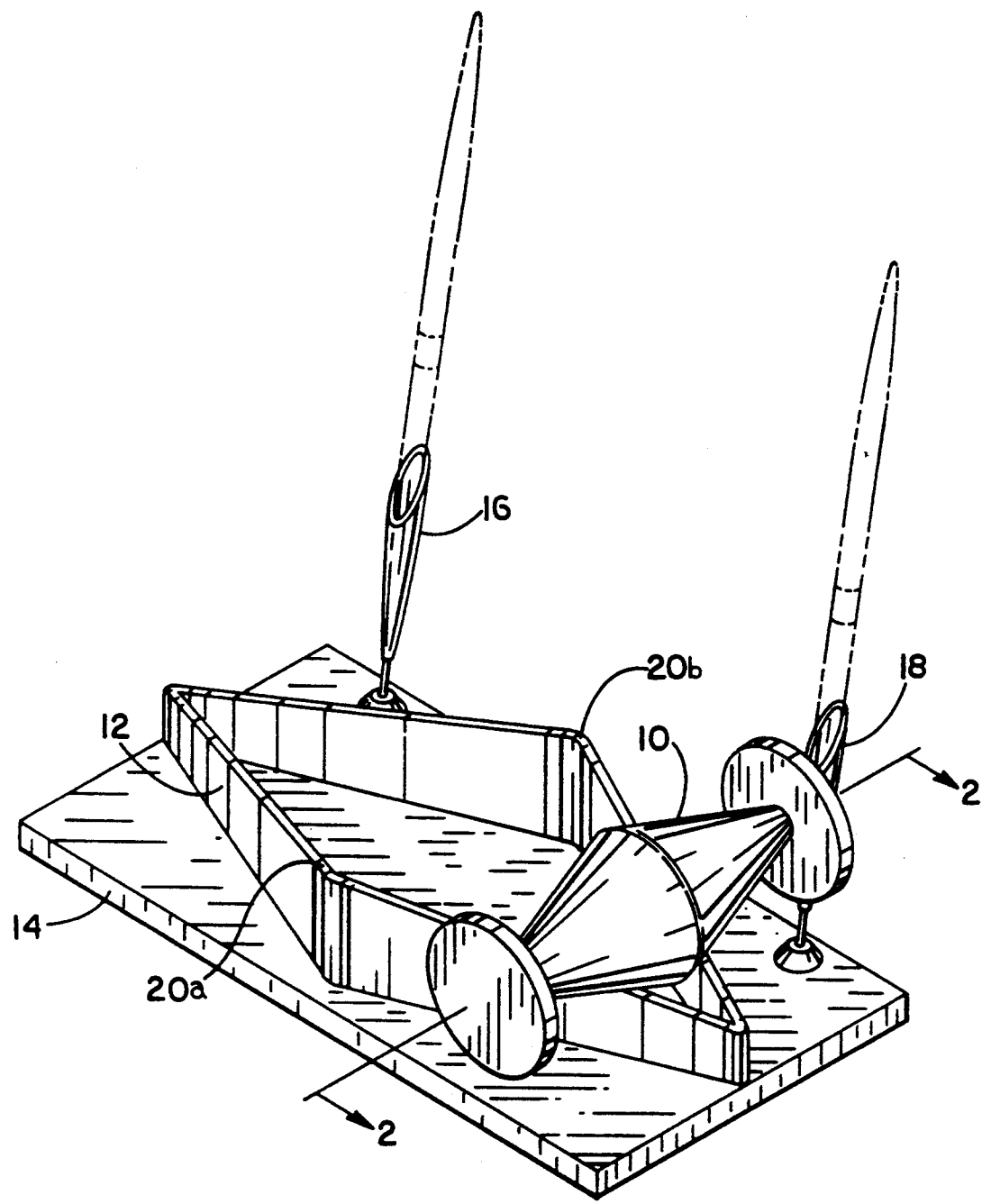
FIG. 1 is a perspective view of the apparatus of the present invention mounted on a base as a desk set.

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

Referring to FIG. 1, it will be seen that the present invention includes a body 10 and a track 12 which cradles the body 10 when placed thereon. In this view, the track 12 is mounted to a base 14 which includes pen holders 16, 18. It will be appreciated, however, that base 14 could be omitted entirely or that track 12 could be mounted to various other support structures if desired. When body 10 is placed upon track 12 at one end or the other, body 10 will roll back and forth between the ends of track 12 until it finally comes to rest in the area of apexes 20a, 20b thereby presenting the illusion of rolling uphill.

Figure 2:
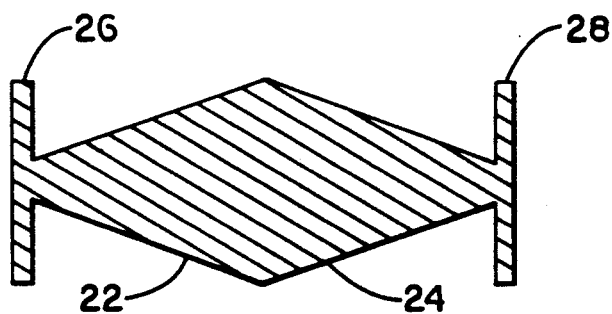
FIG. 2 is a cross-section view of the rolling body portion of the apparatus shown in FIG. 1 taken through line 2—2.

Referring also to FIG. 2, body 10 includes a pair of conic sections 22, 24 of substantially the same dimensions fastened concentrically at their base, the juncture of which is at the approximate midpoint between the two ends of body 10. The angles of the conical tapers between the midpoint of body 10 and each end are preferably the same so that conic sections 22, 24 are substantially symmetrical. A pair of plates 26, 28 are joined to the ends of body 10 with the ends of body 10 terminating at the approximate center point of the face of each plate. Preferably plates 26, 28 are circular disks but other shapes can be used as well. The faces of plates 26, 28 are substantially perpendicular to the longitudinal axis between the ends of body 10. By centering conic sections 22, 24 and plates 26, 28 about the same axis, body 10 will roll smoothly along track 12.

Figure 3:
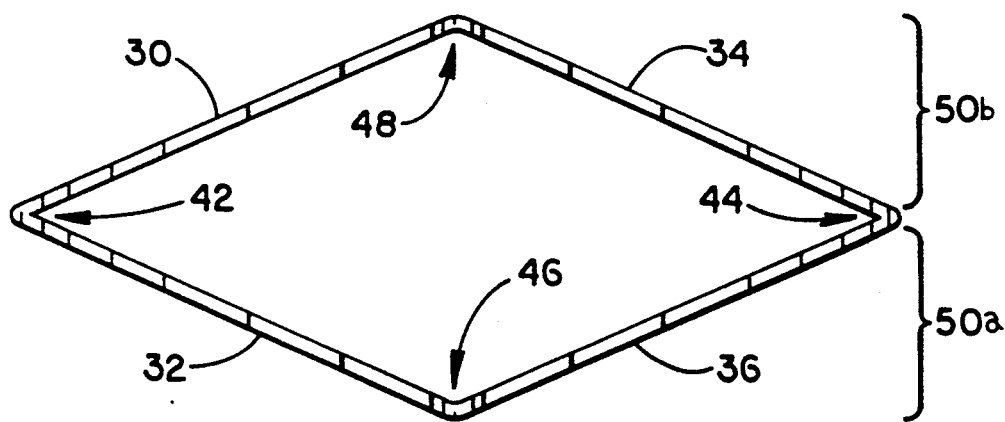
FIG. 3 is a top plan view of the track portion of the apparatus shown in FIG. 1.
Figure 4:
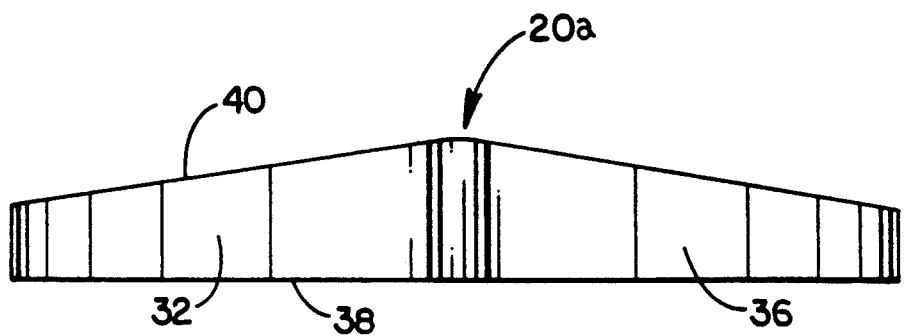
FIG. 4 is a side elevation view of the track shown in FIG. 3.

Referring now to FIG. 3 and FIG. 4, track 12 is a lozenge formation of four panels 30, 32, 34, 36 as shown. Each panel has a planar lower edge 38 and an inclined upper edge 40. The ends of panels 30, 32 are joined at a acute angle to form a V-shaped acute joint 42, and the ends of panels 34, 36 are joined at an acute angle to form a V-shaped acute joint 44. The ends of panels 32, 36 are joined at an obtuse angle to form a V-shaped obtuse joint 46, and the ends of panels 30, 34 are joined at an obtuse angle to form a V-shaped obtuse joint 48. As a result, track 12 is diamond-shaped and panels 30, 34 and 32, 36 form a pair of symmetrical rails 50a, 50b in track 12 with center portions which establish a pair of apexes 20a, 20b in track 12 in the area of obtuse joints 46, 48. Note also that the center portions of rails 50a, 50b are upwardly diverging.

In order for body 10 to roll toward apexes 20a, 20b three structural features must be properly related to each other; that is, the angle of divergence between rails 50a, 50b and the angle of incline toward apexes 20a, 20b must coincide with the angle of the conical tapers in body 10 such body 10 actually rolls slightly downhill at its travels from one of track 12 toward apexes 20a, 20b. While body 10 will appear to be rolling uphill when viewed from either end, the center of gravity will be moving downward and reach its lowest point at apexes 20a, 20b. Due to momentum, body 10 will roll past apexes 20a, 20b when placed at one end of track 12 and then will roll back again toward apexes 20a, 20b under the pull of gravity, thereby moving between the ends of track 12 until it finally comes to rest in the area of apexes 20a, 20b. The point of contact between the conic sections 24, 26 of body 10 and the upper edges of the track will be obscured from the observer by plates 26, 28, which extend radially beyond the upper edges of the track, and the center portion of body 10 where it has its center of gravity will be obscured from the observer by the lower edges of the rails of track 12 meeting base 14 or other planar supporting surface. Therefore, the observer will have a clear illusion that body 10 is rolling uphill against the force of gravity.

Body 10 and track 12 can be fashioned of metal or any material with a sufficiently hard surface to effect smooth rolling with a minimum of friction.

Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An apparatus for illustrating the effects of gravity on a rolling body and creating the illusion of unassisted upward motion, comprising:

(a) a body, said body including first and second ends, said body including a center portion, said body being conically tapered from said center portion to each said end;

(b) a pair of plates, each said plate including a center portion, each said end of said body, joined to a respective one of said plates near said center portion of said plates; and (c) a pair of spaced apart V-shaped symmetrical rails, said rails joined at their ends to form a diamond-shaped track, each said rail including a planar lower edge, each said rail including an upper edge having an inclined center portion, wherein said body will move toward said inclined center portions of said rails when placed upon said track, and wherein each of said plates extends radially beyond said upper edge of said rails thereby obscuring from view the points of contact between said body and said track when said body is placed on said track.

2. An apparatus as recited in claim 1, further comprising a substantially planar base, said lower edges of said rails joined to said base.

3. An apparatus as recited in claim 1, wherein said body is symmetrical about a longitudinal axis between said ends of said body.

4. An apparatus as recited in claim 3, wherein each said plate includes a face positioned substantially perpendicular to said longitudinal axis of said body.

5. An apparatus as recited in claim 4, wherein said plate is disk-shaped.

6. An apparatus for creating the illusion of a body rolling uphill and demonstrating geometrical and gravitational relationships, comprising:

(a) a body having first and second ends, said body including a pair of symmetrical conical-shaped sections, said conical-shaped sections tapering toward said ends;

(b) a pair of plates, each said plate disposed about a respective one of said ends of said body; and (c) an open framed track, said track including first and second symmetrical V-shaped rails, each said rail including an upper edge and an inclined center portion, said rails upwardly diverging, each said rail including a planar lower edge, said first rail joined to said second rail, wherein each of said plates extends radially beyond said upper edge of said rails thereby obscuring from view the points of contact between said body and said track when said body is placed on said track.

7. An apparatus as recited in claim 6, further comprising a substantially planar base, said lower edges of said rails joined to said base.

8. An apparatus as recited in claim 6, wherein each said plate includes a face positioned substantially perpendicular to the longitudinal axis between said ends of said body.

9. An apparatus as recited in claim 6, wherein said plates are circularly disposed about said ends of said body.

10. An apparatus as recited in claim 6, wherein said plates are disk-shaped.

11. An educational device, comprising:

(a) a diamond-shaped open frame track, said track including a first, second, third and fourth panel, each of said panels having first and second ends, each of said panels having a substantially horizontal bottom edge, each of said panels having an inclined upper edge, said first ends of said panels of greater vertical extent than said second ends, said first and second panels joined at said first ends to form a first V-shaped rail, said third and fourth panels joined at said first ends to form a second V-shaped rail, said first and second rails joined at said second ends of said panels, each said rail including an apex, said first and second rails including upwardly diverging center portions;

(b) a body, said body having first and second ends, said body including a center portion, said body being conically tapered from said center portion toward each end to a sufficient extent to cause it to roll along said rails toward said apexes under the urge of gravity; and (c) a pair of disks, each said disk joined to and circularly disposed about a respective one of said ends of said body, said disks substantially perpendicular to a longitudinal axis between said ends of said body, wherein said center portion extends below said upper edge of said panels when said body is placed on said track and said plates obscure from view the points of contact between said body and said track.

12. An apparatus as recited in claim 11, further comprising a substantially planar base, said lower edges of said rails joined to said base.

* * * * *

UNITED STATES PATENT AND TRADEMARK OFFICE
CERTIFICATE OF CORRECTION

PATENT NO. : 5,238,410
DATED : August 24, 1993
INVENTOR(S) : Clinton Barkhurst

It is certified that error appears in the above-indentified patent and that said Letters Patent is hereby corrected as shown below:

Column 4, line 37, after "body" delete ",".

Signed and Sealed this

Tenth Day of May, 1994

Attest:

BRUCE LEHMAN

*Attesting Officer*  Commissioner of Patents and Trademarks